July 14, 1964     T. G. MUELLER     3,140,750
SCALE APPARATUS
Filed Aug. 6, 1963     5 Sheets-Sheet 1

INVENTOR.
Theodore G. Mueller
BY
Walt Thomas Zielinski
ATTORNEY.

July 14, 1964

T. G. MUELLER 3,140,750

SCALE APPARATUS

Filed Aug. 6, 1963

INVENTOR.
Theodore G. Mueller
BY
Walt Thomas Zielinski
ATTORNEY.

INVENTOR.
Theodore G. Mueller
BY
Walt Thomas Zielinski
ATTORNEY.

July 14, 1964

T. G. MUELLER 3,140,750

SCALE APPARATUS

Filed Aug. 6, 1963

INVENTOR.
Theodore G. Mueller
BY
Walt Thomas Zielinski
ATTORNEY.

United States Patent Office 3,140,750
Patented July 14, 1964

3,140,750
SCALE APPARATUS
Theodore G. Mueller, Kenmore, N.Y., assignor to Consolidated Packaging Machinery Corporation, Buffalo, N.Y., a corporation of New York
Filed Aug. 6, 1963, Ser. No. 300,203
2 Claims. (Cl. 177—107)

This invention relates to the weighing of solid materials, whether in the form of powders, flours, pellets, granules, or larger particles. More particularly, it relates to apparatus for automatically and simultaneously dividing a larger quantity of such materials into aliquot portions and weighing the portions, so that, for instance, the individual portions are then ready to be packaged or bagged or otherwise contained for purposes of storage or transportation and distribution. This application is a continuation-in-part of co-pending Serial No. 24,820, filed April 26, 1960, now U.S. Patent No. 3,103,252.

Automatic weighing machines or scales are not new by any means. But simplicity and compactness of construction, as opposed to intricacy and massiveness, are and they are incorporated in the apparatus of the present invention, together with sturdiness and speed, accuracy, and reliability of operation. This will readily be seen when it is considered that the basic cooperating units of such apparatus are few in number and include framework means within which feed hopper means are mounted and on which fulcrum means for the weighing beam means are suspended; hopper bottom gate means suspended from the opposing hopper sides; gate opener and closer means suspended from the framework; counterpoise means connected to, fulcrum means mounted on, and weighing bucket means vertically ordered to lie beneath the hopper bottom and suspended from the weighing beam means; gate closer actuating means; bucket lower end trap door means on which door fastener means are suspended from the opposing lateral surfaces of the bucket means; and, fastener releasing means. Even the preferred embodiment of the apparatus contemplates the further combination therewith of only three more units, i.e., gate closing arresting means, counterpoise compensating means, and weighing beam equililbrium aiding means.

The automatic scale of the present invention differs from the usual balance scale in that the automatic scale meters an amount of the material to be weighed from the feed hopper into the weighing bucket supported at one end of the weighing beam, and the amount metered into the bucket is controlled by a counterpoise, i.e., counterweight, placed at the other end of the weighing beam. More particularly, the amount of flow of the material from the hopper into the bucket is dependent upon the degree to which the hopper bottom is shut by the gate variably or adjustably positioned across it; the positioning of the gate is dependent upon the settings of the gate opener actuating means, the bucket trap door, the gate closer actuating means, and, in the preferred instrument, the gate closing arrester; and, these settings are directly or indirectly controlled by the counterpoise, with or without the assistance of the counterpoise compensating means and the weighing beam equilibrium aiding means, and its effect on the positioning of the weighing beam.

For a better understanding of the apparatus of the invention, reference should be had to the attached drawings in which.

Figure 1:
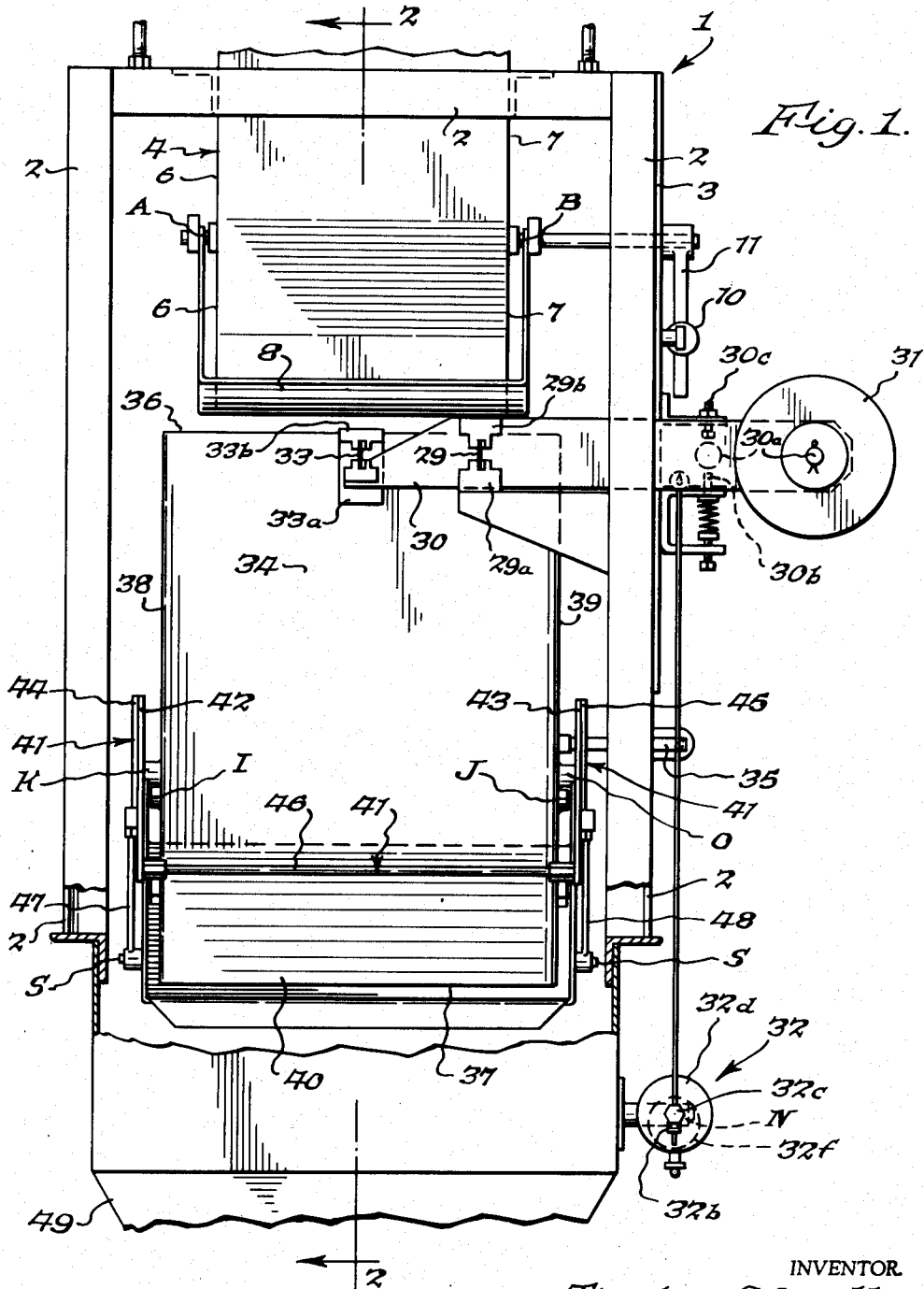
FIGURE 1 is a front view of the automatic weighing mechine in the equilibrium position.

FIGURE 1 depicts a preferred embodiment of the automatic weighing machine of the present invention in which framework 1 is made up of angle irons 2 and plate 3, in which hopper 4 is mounted within framework 1, and in which open hopper bottom 5 is not shown. Opposing hopper sides 6 and 7 serve as bases for the suspension for rotation in a vertical plane of hopper bottom gate 8 at pivot points A and B, respectively. Portions of gate operating, pneumatic pressure cylinder 10 are visible, as is a part of the gate operating arm 11. Next, fulcrum means or first flexible blade 29 is mounted on framework 1 and weighing beam 30 is suspended for rotation in a vertical plane from blade 29, while counterpoise 31 is located on one end of weighing beam 30 and second flexible blade 33 is mounted on the other end. A portion of counterpoise compensating means 32 is also shown. Finally, FIGURE 1 shows weighing bucket 34 suspended for as small a degree of rotation in a vertical plane from second flexible blade 33 as can be insured by sway link 35, and having open upper end 36, open lower end 37 (FIGURE 2), and opposing lateral surfaces 38 and 39. Lower end trap door 40 is suspended for rotation in a vertical plane from surfaces 38 and 39 at pivot points I and J, respectively. Door fastener 41 having fastener toggle joint primary legs 42 and 43, secondary legs 44 and 45 and fastener weight 46 can also be seen, as scan rods 47 and 48 connecting each of secondary legs 44 and 45 to the door 40.

Figure 2:
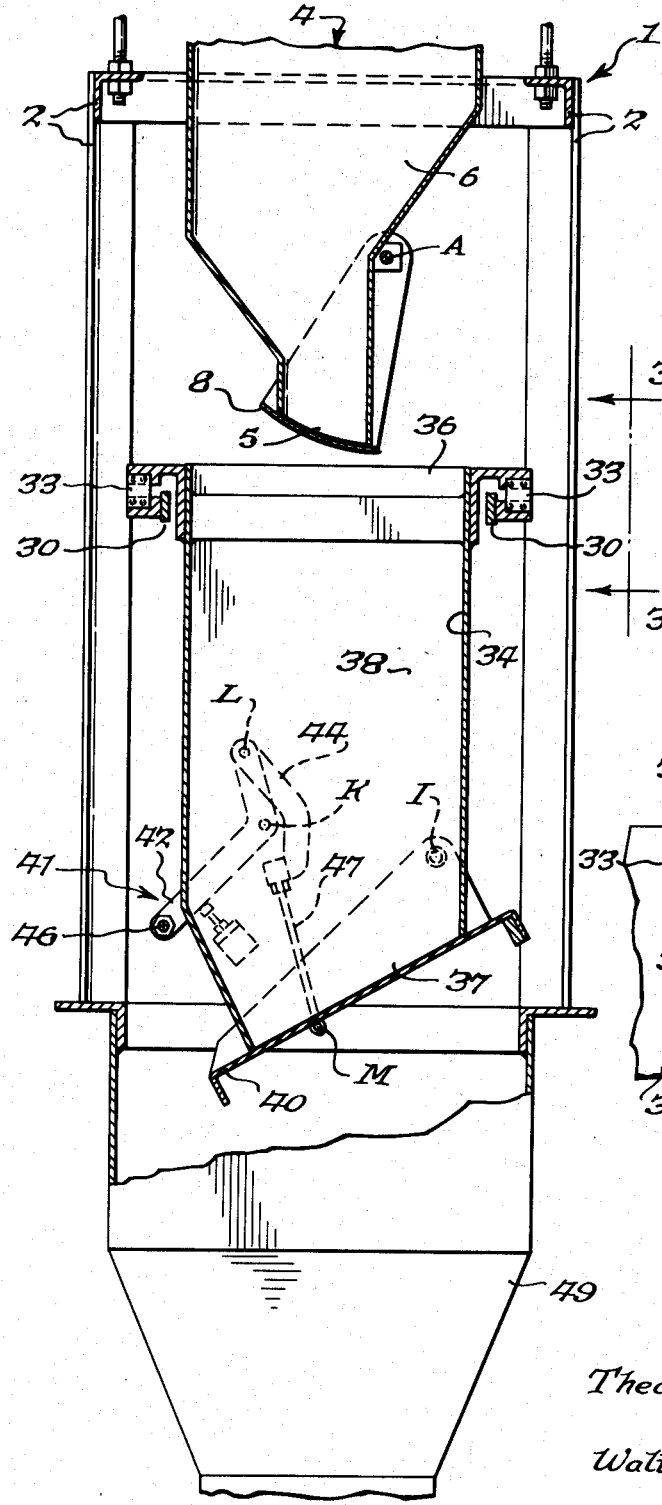
FIGURE 2 is a side section taken along line 2—2 of the automatic weighing machine of FIGURE 1.

FIGURE 2 enables one to see that weighing beam 30 is actually made up of two parallel members joined together by dowel 30a (shown dotted in FIGURE 1), so that weighing bucket 34 is carried on two second flexible blades 33 and between the two weighing beam 30 members. It also makes clearer the structure of the toggle joints of fastener 41 by showing one end of primary leg 42 conected to fastener weight 46 and the whole leg suspended for rotation in a vertical plane from surface 38 at pivot point K. Secondary leg 44, on the other hand, is suspended at one end for rotation in a vertical plane from the other end of primary leg 42 at pivot point L and suspended at the other end for rotation in a vertical plane from door 40 at point M by means of rod 47.

Figure 3:
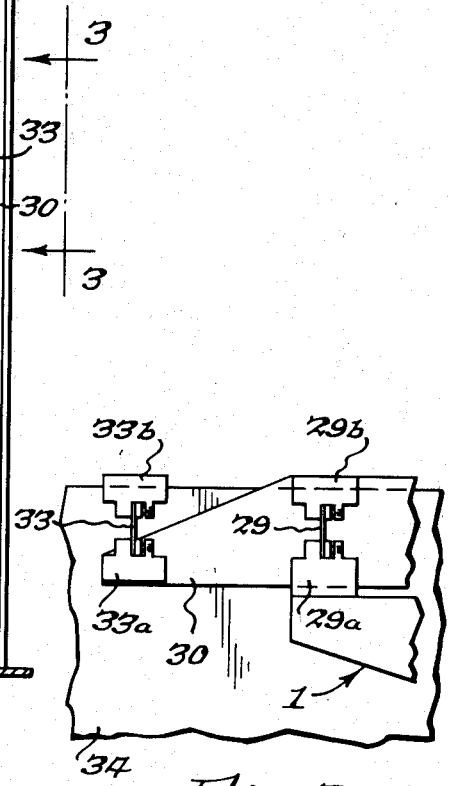
FIGURE 3 is a partial front view taken along line 3—3 of FIGURE 2, showing an enlarged detail of the fulcrum means for pivotally supporting the weighing beam and the bucket.

FIGURE 3 shows a close-up of first flexible blade 29 and second flexible blade 33 held at their lower ends in blocks 29 and 33a and at their upper ends in blocks 29b and 33b to carry the weight of the beam and bucket in compression. The unsupported centers of these blades, or fulcrums, are sufficiently flexible to permit the beam and bucket to rotate angularly about the true center of the blades in a vertical plane with no perceptible torsional resistance or friction. It will be noted that block 29a is supported by framework 1, blocks 29b and 33a are attached to beam 30, while block 33b is attached to bucket 34.

Figures 4, 5:
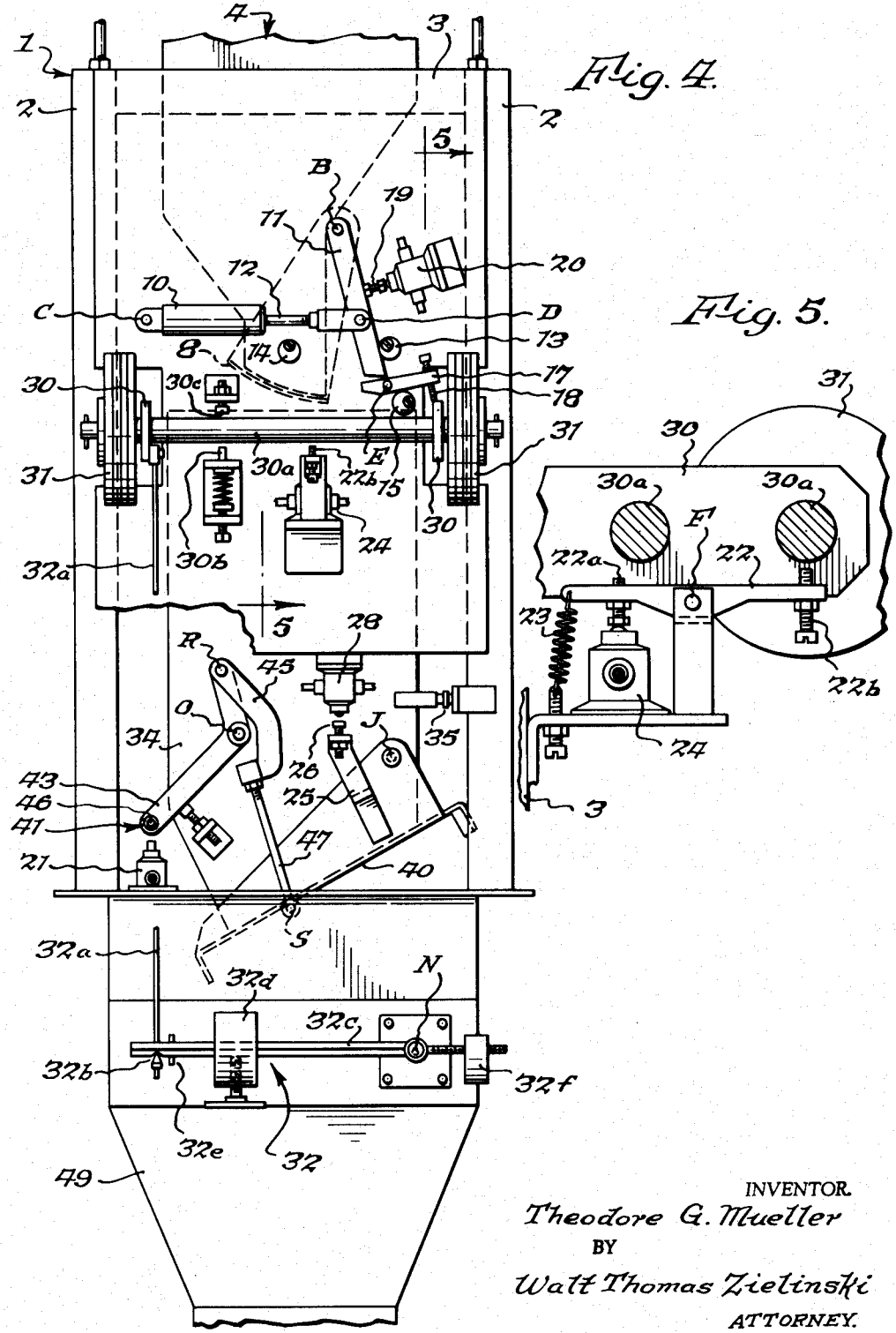
FIGURE 4 is a side view of the automatic weighing machine of FIGURE 1 after completion of a weighing, with beam overbalanced, arrester tripped, and gate completely closed, ready for the bucket to be dumped.
FIGURE 5 is an enlarged section taken along line 5—5 of FIGURE 4, showing gate closer actuating means of the automatic weighing machine.

FIGURE 4 shows dual acting piston cylinder 10 and movable piston rod 12 disposed therein for opening and closing gate 8 in response to pneumatic, e.g., air, pressure directed to either or both ends of the cylinder and against either or both sides of the piston head by suitable ports therein and piping (FIGURE 9) from first valve means or opener valve 28 or second valve means or closer valve 24. Cylinder 10 is pivotally mounted at C to framework plate 3 permitting such angular rotation in a vertical plane as is permitted by connecting rod 12 pivoted at point D of arm 11. Arm 11 is attached to gate 8 by means of an axial extension through framework plate 3 for rotation in a vertical plane about pivot B. As cylinder rod 12 retracts, arm 11 is moved angularly toward the left causing gate 8 to uncover opening 5 in hopper 4 and permit a full flow of material from hopper into bucket 34. This angular swing is limited by contact of arm 11 with eccentric adjustable stop 14. When cylinder rod 12 is extended, it carries arm 11 to the right, moving gate 8 toward a closed position. However, gate 8 is halted in a partially closed, or dribble flow position, by arm 11 impinging against arrester bar 17, suspended for rotation in a vertical plane from framework plate 3 at pivot point E, with the long end of the bar resting on eccentric adjustable stop 15 and the short end of the bar projecting into the path of arm 11, thus acting as a barrier to the further movement of this arm. When the bucket has received an amount of material in excess of the counterpoise weight, the counterpoise end of the beam rises past a horizontal position, impinging against screw 18 projecting downwardly through bar 17, causing the bar to rotate so that the short end moves downwardly out of contact with arm 11, permitting cylinder 10 to move arm 11 against eccentric adjustable stop 13, so that gate 8 entirely closes opening 5 in hopper 4, shutting off the flow of material and completing the weighing operation. Shown also is third valve means or interlock valve 20, communicating by piping (FIGURE 9) with trip cylinder 21 which carries a prod the function of which is to unlatch door fastener 41 when bucket 34 is to be emptied. It will be noted that valve 20 is opened to the flow of air when screw 19 attached to arm 11 impinges against valve 20, and this only when gate 8 is completely closed, thereby preventing the simultaneous opening of gate 8 and door 40, when would result in a continuous uncontrolled flow of material through the scale without any weighing taking place.

Further, FIGURE 4 depicts weighing beam equilibrium aiding means, i.e., compression spring-biased inertia breaker 30b and weighing beam dowel brake 30c, whose function is to limit the upward travel of the beam. As shown, compensating means 32 are mounted on a funnel 49 into which bucket 34 can be dumped. The purpose they serve is to compensate for the fact that, because of the inertia of weighing beam 30 and counterpoise 31, the latter cannot be moved toward an equilibrium position or beyond unless an excess amount of the material to be weighed is fed from hopper 4 into bucket 34 and that such an excess will add from 2 to 5% by weight of the material to each desired portion thereof. And the way they effect their compensation is, after some trial and error, by lightening the counterpoise load on weighing beam 30 sufficiently to reduce the 2 to 5% overweight in each weighed portion to about 0.1% by weight. Now, the parts of compensating means 32 include rod 32a rotatably connecting them to weighing beam 30, a small knife-edge 32b on the end of rod 32a, a cross-piece 32c resting at one end on knife-edge 32b and suspended at the other end for rotation in a vertical plane from funnel 49 at pivot point N, a weight 32d slidably mounted on cross-piece 32c between stop pin 43e and point N, and another weight 32f threadably mounted on cross-piece 32c outwardly of point N. Such parts work together so that, when bucket 34 is empty and no counterpoise has been placed on weighing beam 30, movement of weight 32d toward stop pin 32e places the machine generally in balance and movement of weight 32f on cross-piece 32c effects a fine balance and so that, when bucket 34 is still empty, but counterpoise 31 has been placed on weighing beam 30, movement of weight 32d toward pivot point N lightens the counterpoise load on weighing beam 30.

Again, FIGURE 4 shows parts of the means of fastening door 40 on bucket 34 shut and the means by which gate 8 on hopper 4 is opened, i.e., valve 28, valve actuating finger 25 attached to door 40 and adjusting screw 26. The former include fastener toggle joint primary leg 43 connected at one end to fastener weight 46 and suspended for rotation in a vertical plane from surface 39 at pivot point O and secondary leg 45 suspended at one end for rotation in a vertical plane from primary leg 43 at pivot point R and suspended at the other end for rotation in a vertical plane, by means of rod 48, to door 40 at pivot point S.

Figure 9:
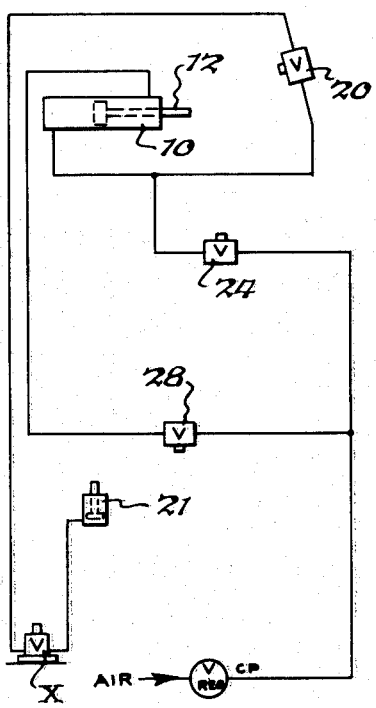
FIGURE 9 is a diagrammatic representation of the air circuitry required for scale operation actuating valves and cylinders.

FIGURE 5 shows gate closer valve 24 and oscillating lever 22 pivoted for rotation in a vertical plane about point F, with spring 23 urging lever 22 to rotate and screw 22a (projecting downwardly through lever 22) to impinge against the stem of valve 24, thereby opening the valve to permit the flow of air pressure to the head end of cylinder 10 to close gate 8 as is further developed in FIGURE 9. It will be noted that this valve is so positioned that screw 22b projecting upwardly through lever 22 lies directly under beam dowel 30a of weighing beam 30, so that when scale bucket 34 is discharged and the counterpoise end of beam 30 drops downward, the under side of dowel 30a impinges against screw 22b causing that end of lever 22 to rotate downwardly and the opposite end of the lever to rotate upwardly, stretching tension spring 23 and carrying screw 22a out of contact with stem of valve 24, permitting the valve to close against the air pressure and exhausting the air from the head end of cylinder 10, just prior to the opening of gate.

Figure 6:
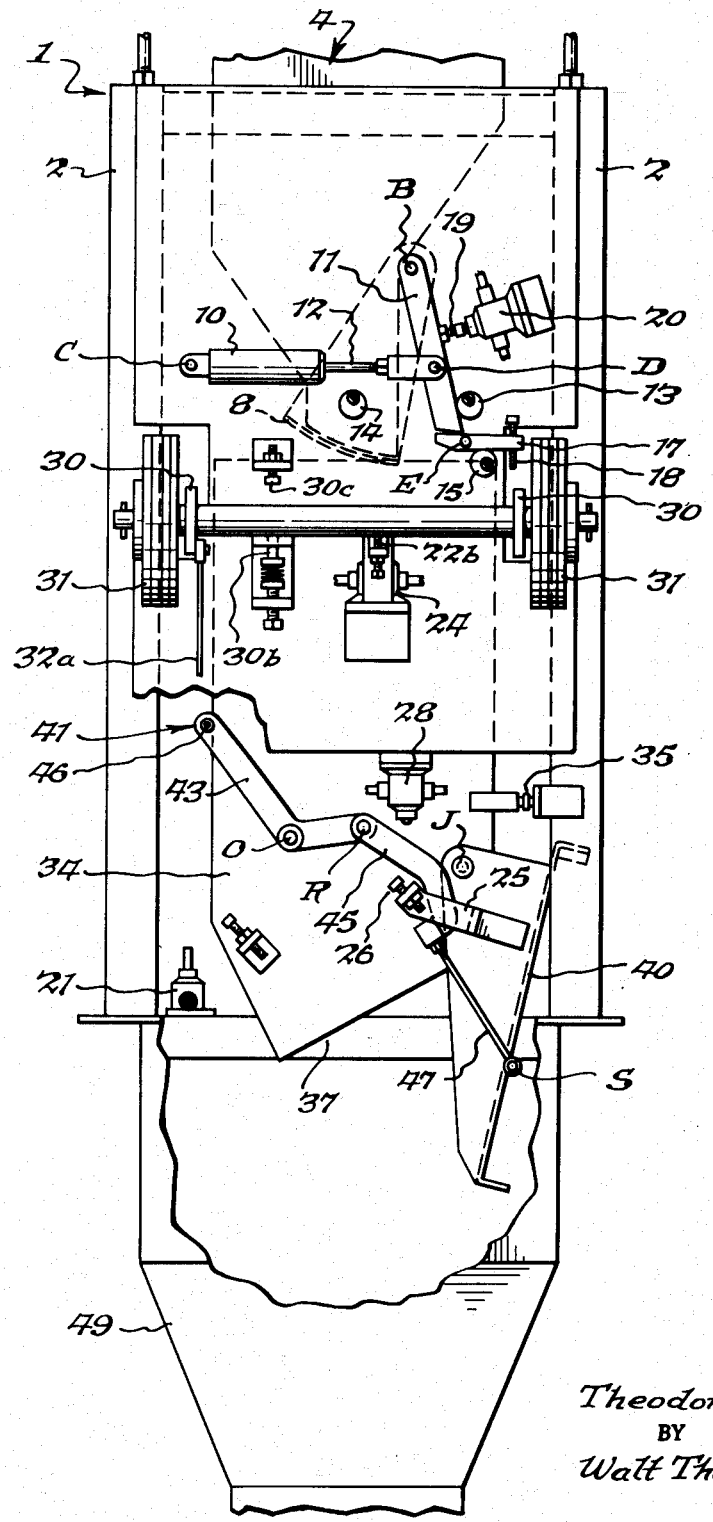
FIGURE 6 is a side view of the automatic weighing machine of FIGURE 1 in the door fastener released (dumping or unloading) position.
Figure 7:
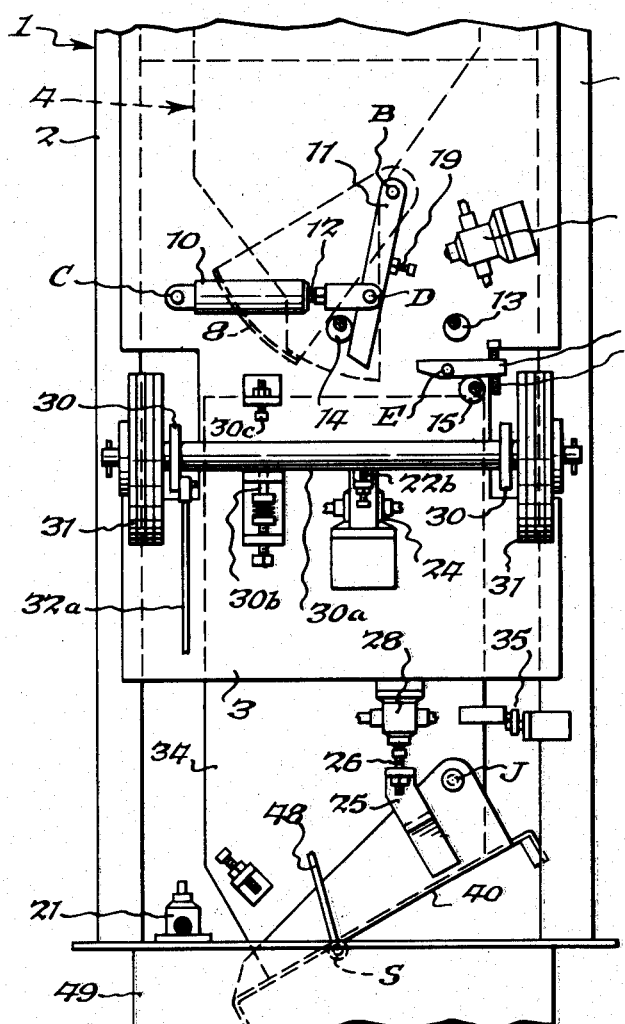
FIGURE 7 is a side view of the automatic weighing machine of FIGURE 1 in the gate opened (loading) position.

FIGURES 6 and 7 illustrate the operation of the automatic weighing machine of the invention. Thus, in FIGURE 6, hopper 4 is seen to be closed by gate 8, while bucket 34 has its open lower end 37 uncovered so that it can empty. This uncovering is accomplished by the undoing of fastener 41 on trap door 40, which is in turn brought about by the manually or automatically inspired action against fastener weight 46 of the fastener releasing device 21 (which receives air pressure through valve 20 after gate 8 is closed), raising fastener toggle joint primary legs 42 and 43 upwardly about pivot points K and O, respectively and, due to the weight of material in the bucket resting on trap door 40 exerting a downward pull on rods 47 and 48, causing secondary legs 44 and 45 to continue rotating about points L and R, respectively, until the door is completely open and material discharged. It must be noted that as the bucket is being emptied, weighing beam 30 moves to a position favoring the counterpoise end, which drops downward so that beam dowel 30a impinges on plunger 30b of spring-biased weighing beam equilibrium aiding means, compressing the spring which exerts an upward force, acting as a cushion and also tending to restore beam 30 to a horizontal position. Of course, the effect of means 30b diminishes as material being fed into bucket 34 causes the movement of weighing beam 30 to favor it. It must also be noted that dowel 30a in its descent also causes valve 24 to close, exhausting the air pressure from the head end of cylinder 10 in anticipation of the closing of trap door 40. After all of the mamaterial has been discharged, trap door 40 will, due to its own equilibrium, tend to swing to a partially closed position and, aided by fastener weight 46 exerting a downward pull on levers 42 and 43, and a similar upward pull on legs 44 and 45, as well as on rods 47 and 38, continue to move to a locked position as shown in FIGURE 7. In this position screw 26, carried by bracket 25 on door 40, impinges against the stem of valve 28 from below, and opens valve 28 to the flow of air through piping (FIGURE 9) to the rod end of cylinder 10, causing cylinder rod 12 to retract and to open gate 8, as further depicted in FIGURE 7, so that material flows from hopper 4 into bucket 34, starting another weighing.

Figure 8:
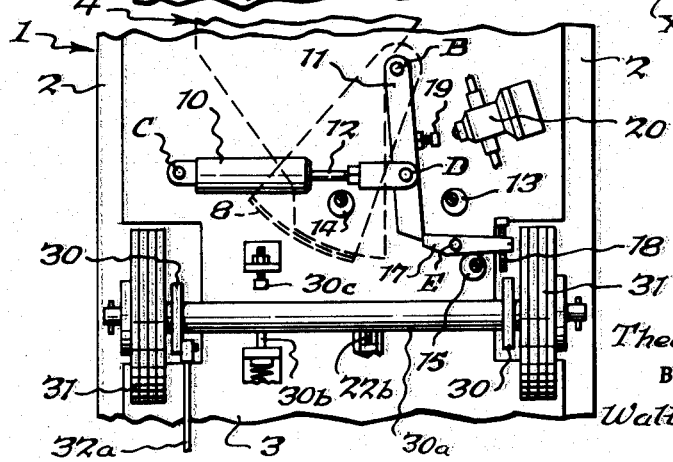
FIGURE 8 is a partial side view showing the feed hopper gate of the automatic weighing machine of FIGURE 7 as it pauses in the dribble position before returning to the closed position.

FIGURE 8 shows a partially completed weighing, in which the bucket has received its bulk flow of material, and the beam, assisted by the weighing beam equilibrium aiding means has risen to a horizontal position, causing cylinder 10 to move gate 8 towards a closed position, but halted in a dribble feed position by arrester 17 blocking the path of lever 11.

FIGURE 9 shows first, second, and third pressure communicating means or supply lines to carry compressed air to valves 24 and 28, valve 28 being directly connected by the first means to the rod end of cylinder 10 for opening gate 8, and valve 24 being connected by the second means to the head end of cylinder 10 for closing gate 8. This second line is also connected by the third means to interlock valve 20 to carry air to cylinder 21 to discharge the scale. It will also be noted that valve X is interposed in the third line. This valve can be opened manually or automatically, as by a solenoid, or it can be left open at all times. Clearly, valve X functions to control the pressure entering trip cylinder 21.

What is claimed is:

1. An automatic weighing machine for powdered and particulate solid materials comprising a framework;
    a material hopper having an open bottom and opposing sides and being mounted within the framework;
    a bottom gate and lever arm suspended for rotation from the sides;
    a pneumatic pressure gate control having a pressure source, a pressure cylinder having first and second pressure ports at opposing ends, first and second pressure communicating means disposed between the source and the ports, a movable piston head disposed within the cylinder between the ports, a piston rod connected at one end to the piston head and at the other end to the lever arm;
    a gate opener having first valve means disposed in the first pressure communicating means between the source and the first pressure port;
    a gate closer having second valve means disposed in the second pressure communicating means between the source and the second pressure port;
    a first flexible blade mounted on the framework;
    a weighing beam having one end adapted to impinge against and open the second valve means when the weighing beam is in equilibrium and being suspended for rotation from the first flexible blade;
    a counterpoise connected to the one end of the weighing beam;
    a second flexible blade mounted on the other end of the weighing beam;
    a material weighing bucket having an open upper end positioned beneath the bottom, an open lower end, and opposing lateral surfaces and being suspended for rotation from the second flexible blade;
    a lower end trap door having means adapted to open the first valve means when the door is closed and being suspended for rotation from the surfaces;
    a door fastener having fastener toggle joints and a fastener weight and being suspended for rotation from the surfaces, the fastener toggle joints having primary legs each connected at one end to the fastener weight and suspended for rotation from a surface and having secondary legs each suspended at one end for rotation from an other end of a primary leg and suspended at the other end for rotation from the door;
    a pneumatic fastener release device having a third pressure communicating means connected at one end to the second pressure communicating means between the second pressure port and the second valve means and at the other end to a movable prod adapted to impinge against the fastener weight from below when the weighing beam is in equilibrium, a third valve means disposed in the third pressure communicating means between its ends and adapted to be impinged against by the lever arm.

2. The machine of claim 1 wherein there is a lever arm arrester having a bar adapted to impinge the one end of the weighing beam and being suspended for rotation from the framework.

References Cited in the file of this patent

UNITED STATES PATENTS

| | | |
|---|---|---|
| 867,745 | McLeod | Oct. 8, 1907 |
| 2,097,522 | Hanique | Nov. 2, 1937 |
| 2,918,247 | Nowak | Dec. 22, 1959 |
| 3,000,454 | Hopkins et al. | Sept. 19, 1961 |
| 3,024,857 | Charcuset et al. | Mar. 13, 1962 |